United States Patent
Kuo et al.

(10) Patent No.: US 10,868,629 B2
(45) Date of Patent: Dec. 15, 2020

(54) CHANNEL MULTIPLEXING WITHIN INTERLACE FOR NEW RADIO UNLICENSED SPECTRUM OPERATION

(71) Applicant: MediaTek Inc., Hsinchu (TW)

(72) Inventors: Chun-Hsuan Kuo, San Jose, CA (US);
Jiann-Ching Guey, Hsinchu (TW);
Chiou-Wei Tsai, Hsinchu (TW);
Ming-Po Chang, Hsinchu (TW);
Cheng-Rung Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/377,123

(22) Filed: Apr. 5, 2019

(65) Prior Publication Data

US 2019/0312660 A1  Oct. 10, 2019

Related U.S. Application Data

(60) Provisional application No. 62/670,621, filed on May 11, 2018, provisional application No. 62/654,280, filed on Apr. 6, 2018.

(51) Int. Cl.
*H04J 13/16* (2011.01)
*H04J 13/00* (2011.01)
(Continued)

(52) U.S. Cl.
CPC .......... *H04J 13/16* (2013.01); *H04J 13/0003* (2013.01); *H04L 1/0071* (2013.01); *H04W 72/0453* (2013.01); *H04J 2013/165* (2013.01)

(58) Field of Classification Search
CPC .. H04J 13/16; H04J 13/0003; H04J 2013/165; H04J 2203/0069;
(Continued)

(56) References Cited

U.S. PATENT DOCUMENTS

2019/0268907 A1* 8/2019 Bhattad ............. H04W 72/0453
2019/0306832 A1* 10/2019 Si ........................ H04L 27/2666
(Continued)

FOREIGN PATENT DOCUMENTS

CN          102412937 A         4/2012

OTHER PUBLICATIONS

China National Intellectual Property Administration, International Search Report and Written Opinion for International Patent Application No. PCT/CN2019/081776, dated Jul. 5, 2019.
(Continued)

*Primary Examiner* — Sharad Rampuria
(74) *Attorney, Agent, or Firm* — Han IP PLLC; Andy M. Han

(57) ABSTRACT

Techniques and examples of channel multiplexing within interlace for New Radio (NR) unlicensed spectrum (NR-U) operation are described. An apparatus (e.g., user equipment (UE)) determines which sub-interlace of multiple sub-interlaces in each of a plurality of interlaces is assigned to the apparatus. The apparatus then performs an uplink (UL) transmission to a wireless network in an NR-U using the assigned sub-interlace in each of the plurality of interlaces. Each of the plurality of interlaces may be divided into respective multiple sub-interlaces with channel multiplexing.

14 Claims, 5 Drawing Sheets

(51) Int. Cl.
*H04W 72/04* (2009.01)
*H04L 1/00* (2006.01)

(58) Field of Classification Search
CPC . H04W 72/0453; H04W 72/04; H04W 72/12; H04W 76/00; H04W 16/14; H04L 1/0071; H04L 5/0037; H04L 27/0006; H04L 5/0016; H04B 7/2121; H04B 7/2123; H04Q 2213/394
See application file for complete search history.

(56) References Cited

U.S. PATENT DOCUMENTS

2019/0313413 A1* 10/2019 Kuo ................ H04W 28/16
2019/0313458 A1* 10/2019 Zeng ............... H04W 16/14

OTHER PUBLICATIONS

Kddi et al., L1/L2 Control Channel Structure with CDM Based Multiplexing in E-UTRA Downlink, R1-063349, 3GPP TSG RAN WG1 Meeting #47, Riga, Latvia, Nov. 6-10, 2006.
LG Electronics, PUCCH transmission in LAA, R1-160627, 3GPP TSG RAN WG1 Meeting #84, St Julian's, Malta, Feb. 15-19, 2016.
Huawei et al., Discussion on Channel Multiplexing of RS for High Frequency, R1-167222, 3GPP TSG RAN WG1 Meeting #86, Gothenburg, Sweden, Aug. 22-26, 2016.

* cited by examiner

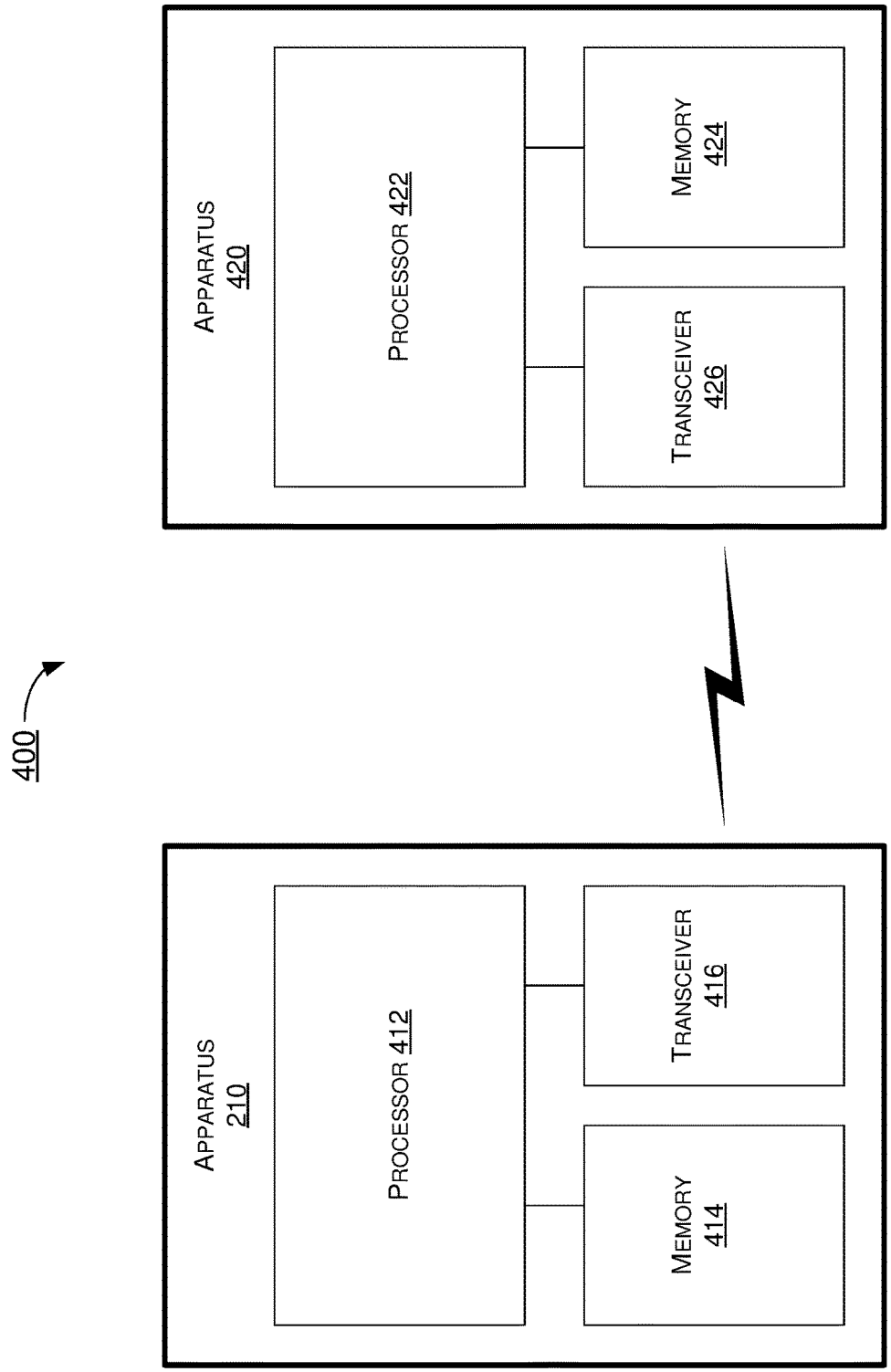

500

DETERMINE, BY A PROCESSOR OF AN APPARATUS, WHICH SUB-INTERLACE OF MULTIPLE SUB-INTERLACES IN EACH OF A PLURALITY OF INTERLACES IS ASSIGNED TO THE APPARATUS
510

PERFORMING, BY THE PROCESSOR, AN UPLINK (UL) TRANSMISSION TO A WIRELESS NETWORK IN A NEW RADIO UNLICENSED SPECTRUM (NR-U) USING THE ASSIGNED SUB-INTERLACE IN EACH OF THE PLURALITY OF INTERLACES, WHICH IS DIVIDED INTO RESPECTIVE MULTIPLE SUB-INTERLACES WITH CHANNEL MULTIPLEXING
520

CHANNEL MULTIPLEXING WITHIN INTERLACE FOR NEW RADIO UNLICENSED SPECTRUM OPERATION

CROSS REFERENCE TO RELATED PATENT APPLICATION

The present disclosure claims the priority benefit of U.S. Provisional Patent Application Nos. 62/654,280 and 62/670,621, filed on 6 Apr. 2018 and 11 May 2018, respectively. Contents of aforementioned applications are herein incorporated by reference in their entirety.

TECHNICAL FIELD

The present disclosure is generally related to mobile communications and, more particularly, to channel multiplexing within interlace for New Radio (NR) unlicensed spectrum (NR-U) operation.

BACKGROUND

Unless otherwise indicated herein, approaches described in this section are not prior art to the claims listed below and are not admitted as prior art by inclusion in this section.

For an NR communication system operating at 5 GHz unlicensed band, the European Telecommunications Standards Institute (ETSI) regulation requires a maximum power spectral density (PSD) level of 10 dbm/MHz and an occupied channel bandwidth (OCB) of at least 80% (and up to 100%) of the nominal channel bandwidth. In Long-Term Evolution (LTE) enhanced Licensed Assisted Access (eLAA), block interlaced frequency-division multiple access (B-IFDMA) is introduced for uplink (UL) transmission in order to comply with the ETSI requirements for both OCB and maximum PSD level, while at the same time maintaining a transmit (TX) signal power level that can support a desired cell coverage.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method may involve a processor of an apparatus determining which sub-interlace of multiple sub-interlaces in each of a plurality of interlaces is assigned to the apparatus. The method may also involve the processor performing an UL transmission to a wireless network in an NR-U using the assigned sub-interlace in each of the plurality of interlaces. Each of the plurality of interlaces may be divided into respective multiple sub-interlaces with channel multiplexing.

In one aspect, an apparatus may include a transceiver and a processor coupled to the transceiver. During operation, the transceiver may wirelessly communicate with a wireless network. During operation, the processor may perform operations including: (a) determining which sub-interlace of multiple sub-interlaces in each of a plurality of interlaces is assigned to the apparatus; and (b) performing, via the transceiver, an UL transmission to a wireless network in an NR-U using the assigned sub-interlace in each of the plurality of interlaces. Each of the plurality of interlaces may be divided into respective multiple sub-interlaces with channel multiplexing.

It is noteworthy that, although description provided herein may be in the context of certain radio access technologies, networks and network topologies such as 5G NR, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, and Internet-of-Things (IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 4 is a block diagram of an example system in accordance with an implementation of the present disclosure.

FIG. 5 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Current design for NR-U operation assumes an interlace can only be allocated to a single user equipment (UE). However, when the number of interlaces is insufficient to support the number of UEs requesting for transmission, the UEs could be forced to use time-division multiplexing (TDM) for transmission. Given that transmissions in NR-U are subject to listen-before-talk (LBT), it is likely that the UEs may experience more system overheads when transmitting with TDM. Moreover, for systems with large subcarrier spacing (SCS), the allowed interlace design becomes very restrictive due to OCB requirements. Under current regulation, assigning a given interlace to multiple UEs could significantly improve performance. However, current design does not support such a feature.

In view of the above, the present disclosure aims to provide various solutions and/or schemes to address aforementioned issues with current design for NR-U operation. Under a proposed scheme in accordance with the present disclosure, channel multiplexing within a given interlace may be utilized. It is believed that, with channel multiplexing within interlaces, a more flexible assignment between UEs and interlaces may be achieved, thereby leading to significant improvement in system performance. Additionally, with channel multiplexing within interlaces, it is also believed that OCB requirements may be satisfied.

Figure 1:
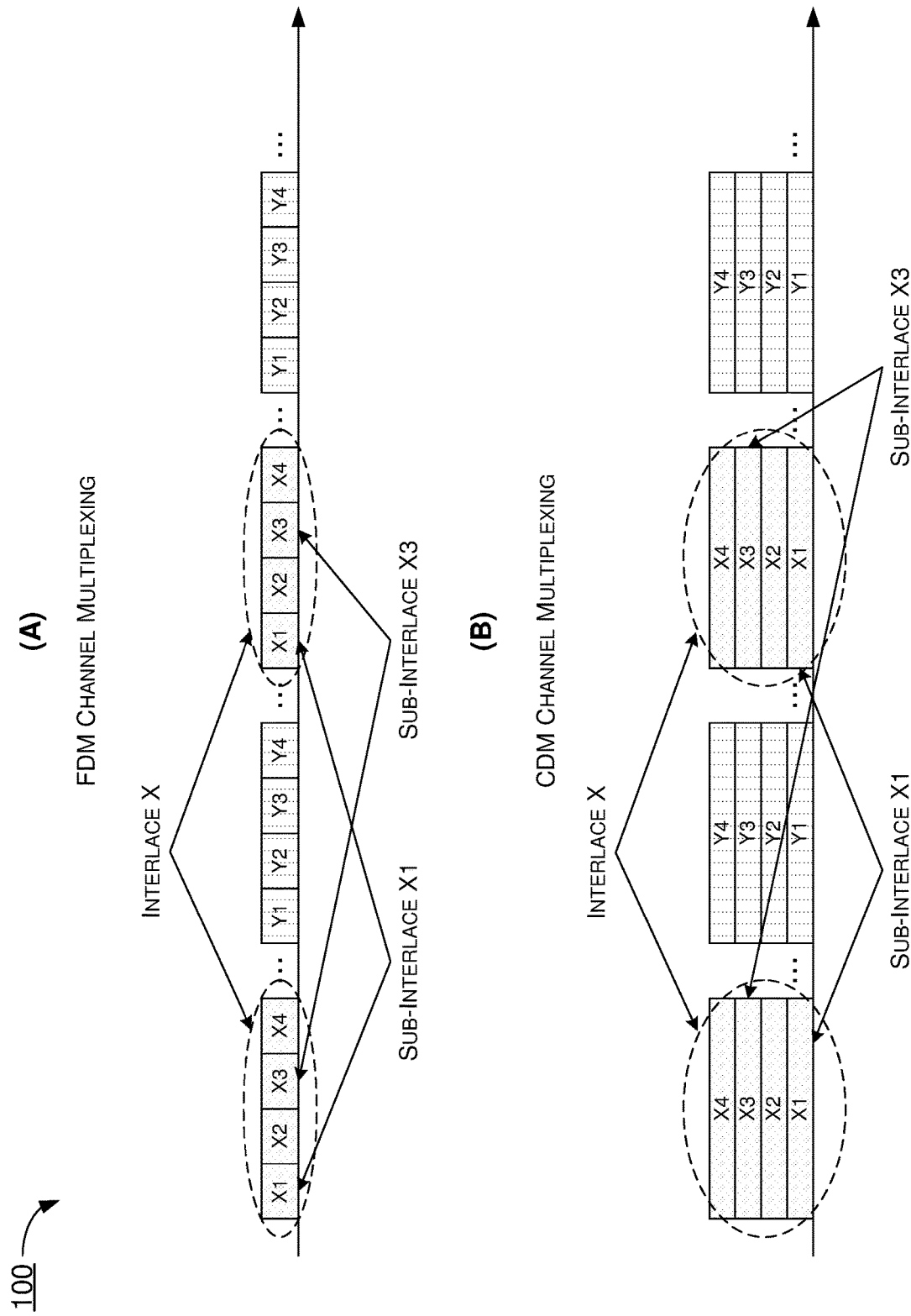
FIG. 1 is a diagram of an example scenario in accordance with an implementation of the present disclosure.

FIG. 1 illustrates an example scenario 100 of channel multiplexing within interlaces in accordance with an implementation of the present disclosure. Part (A) of FIG. 1 illustrates an example of channel multiplexing within each interlace of a plurality of interlaces by frequency-division multiplexing (FDM). Part (B) of FIG. 1 illustrates an example of channel multiplexing within each interlace of a plurality of interlaces by code-division multiplexing (CDM). Although not shown in FIG. 1, it is also envisioned that channel multiplexing within each interlace of a plurality of interlaces may be achieved by time-division multiplexing (TDM). Thus, under a proposed scheme in accordance with the present disclosure, channel multiplexing within a given interlace may involve any of FDM, CDM and TDM.

Referring to part (A) and part (B) of FIG. 1, under the proposed scheme, resources within each interlace may be divided into M portions (e.g., M=4 in FIG. 1) or M sub-interlaces, with each sub-interlace assigned to a respective UE (e.g., sub-interlace X1 assigned to UE1, sub-interlace X2 assigned to UE2, and so on). Accordingly, each original interlace (e.g., interlace X) may thus be shared by up to M (e.g., 4) UEs. For instance, in part (A) of FIG. 1, each interlace X is further divided into sub-interlaces X1, X2, X3 and X4 with channel multiplexing by FDM. Similarly, in part (A) of FIG. 1, each interlace Y is further divided into sub-interlaces Y1, Y2, Y3 and Y4 with channel multiplexing by FDM. Additionally, in part (B) of FIG. 1, each interlace X is further divided into sub-interlaces X1, X2, X3 and X4 with channel multiplexing by CDM. Likewise, in part (B) of FIG. 1, each interlace Y is further divided into sub-interlaces Y1, Y2, Y3 and Y4 with channel multiplexing by CDM.

Figure 2:
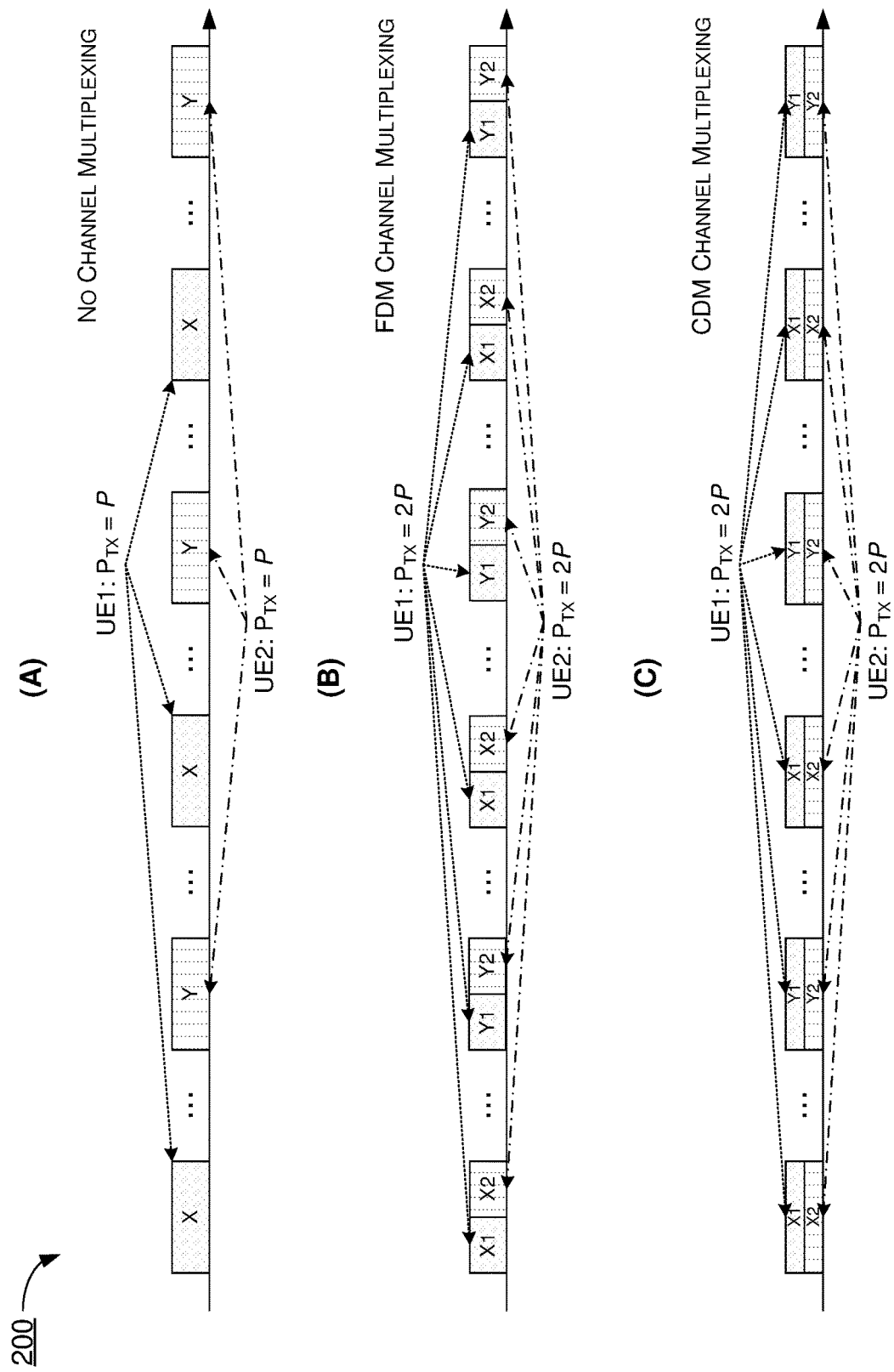
FIG. 2 is a diagram of an example scenario in accordance with an implementation of the present disclosure.

FIG. 2 illustrates an example scenario 200 of multi-interlace to multi-UE assignment with channel multiplexing within interlaces in accordance with an implementation of the present disclosure. Part (A) of FIG. 2 illustrates no channel multiplexing under current design. Part (B) of FIG. 2 illustrates channel multiplexing within interlaces by FDM. Part (C) of FIG. 2 illustrates channel multiplexing within interlaces by CDM. As shown in part (B) and part (C) of FIG. 2, with channel multiplexing, for the same amount of resources not only a UE may be allocated with more interlaces but the UE may also transmit at a higher power, thereby leading to enhancement in both performance and area of cell coverage. For instance, compared to part (A) of FIG. 1, which shows that each of UE1 and UE2 transmits at a power level P, in part (B) and part (C) of FIG. 2 the transmit power (Prx) of each of UE1 and UE2 may be doubled at 2P when two interlaces (e.g., interlace X and interlace Y) are assigned to each of UE1 and UE2.

Figure 3:
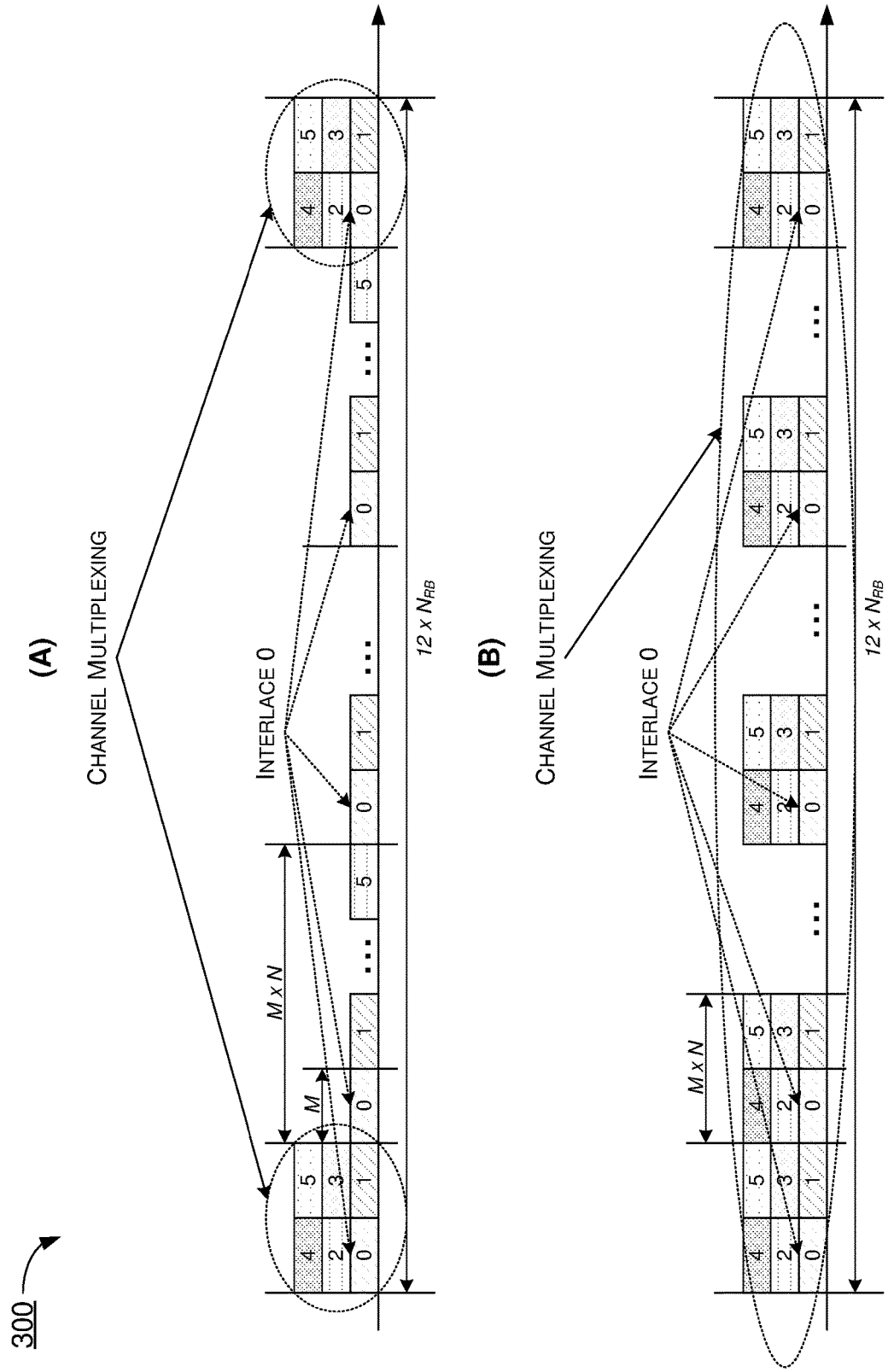
FIG. 3 is a diagram of an example scenario in accordance with an implementation of the present disclosure.

FIG. 3 illustrates an example scenario 300 of interlace design allowing channel multiplexing in accordance with an implementation of the present disclosure. Under a proposed scheme in accordance with the present disclosure, more interlaces may be allowed and still meet the OCB requirements. Referring to part (A) of FIG. 3, under the proposed scheme, channel multiplexing may be allowed for each of one or more remaining physical resource blocks (PRBs) when the total number of PRBs per symbol is not an integer multiple of the number of interlaces per symbol. As shown in part (A) of FIG. 3, each of the one or more remaining PRBs may be located at the two opposite ends of the NR-U to ensure compliance with the OCB requirements. That is, under the proposed scheme, channel multiplexing may be allowed for some but not all PRBs (e.g., allowed for the one or more remaining PRBs) within an interlace. Alternatively, referring to part (B) of FIG. 3, under the proposed scheme channel multiplexing may be allowed for all PRBs within an interlace. In FIG. 3, M denotes a number of subcarriers per block, N denotes a number of interlaces per symbol, and NRB denotes a total number of resource blocks (RBs) per symbol.

In view of the above, under various proposed schemes in accordance with the present disclosure, channel multiplexing within an interlace may be utilized such that, for a given interlace, the interlace may be further divided with channel multiplexing. Advantageously, more flexibility in resource assignment may be achieved when the number of interlaces is insufficient to support the number of UEs requesting for UL transmissions. Moreover, as the proposed schemes allow an interlace to be assigned to multiple UEs instead of a single UE, significant performance improvement may be achieved. Furthermore, interlace design under the proposed schemes allows channel multiplexing within a given interlace to allow part or all of available PRBs to be allocated to different UEs with channel multiplexing. Advantageously, this allows more interlaces while still meeting the OCB requirements.

Illustrative Implementations

FIG. 4 illustrates an example system 400 having at least an example apparatus 410 and an example apparatus 420 in accordance with an implementation of the present disclosure. Each of apparatus 410 and apparatus 420 may perform various functions to implement schemes, techniques, processes and methods described herein pertaining to channel multiplexing within interlace for NR-U operation, including the various schemes described above with respect to various proposed designs, concepts, schemes, systems and methods described above as well as process 400 described below.

Each of apparatus 410 and apparatus 420 may be a part of an electronic apparatus, which may be a network apparatus or a UE, such as a portable or mobile apparatus, a wearable apparatus, a wireless communication apparatus or a computing apparatus. For instance, each of apparatus 410 and apparatus 420 may be implemented in a smartphone, a smart watch, a personal digital assistant, a digital camera, or a computing equipment such as a tablet computer, a laptop computer or a notebook computer. Each of apparatus 410 and apparatus 420 may also be a part of a machine type apparatus, which may be an IoT apparatus such as an immobile or a stationary apparatus, a home apparatus, a wire communication apparatus or a computing apparatus. For instance, each of apparatus 410 and apparatus 420 may be implemented in a smart thermostat, a smart fridge, a smart door lock, a wireless speaker or a home control center. When implemented in or as a network apparatus, apparatus 410 and/or apparatus 420 may be implemented in a base station, such as an eNB in an LTE, LTE-Advanced or LTE-Advanced Pro network or in a gNB or TRP in a 5G network, an NR network or an IoT network.

In some implementations, each of apparatus 410 and apparatus 420 may be implemented in the form of one or more integrated-circuit (IC) chips such as, for example and without limitation, one or more single-core processors, one or more multi-core processors, or one or more complex-instruction-set-computing (CISC) processors. In the various schemes described above, each of apparatus 410 and apparatus 420 may be implemented in or as a network apparatus or a UE. Each of apparatus 410 and apparatus 420 may include at least some of those components shown in FIG. 4 such as a processor 412 and a processor 422, respectively, for example. Each of apparatus 410 and apparatus 420 may further include one or more other components not pertinent to the proposed scheme of the present disclosure (e.g., internal power supply, display device and/or user interface device), and, thus, such component(s) of apparatus 410 and apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including those pertaining to channel multiplexing within interlace for NR-U operation in accordance with various implementations of the present disclosure.

In some implementations, apparatus 410 may also include a transceiver 416 coupled to processor 412. Transceiver 416 may be capable of wirelessly transmitting and receiving data. In some implementations, apparatus 420 may also include a transceiver 426 coupled to processor 422. Transceiver 426 may include a transceiver capable of wirelessly transmitting and receiving data.

In some implementations, apparatus 410 may further include a memory 414 coupled to processor 412 and capable of being accessed by processor 412 and storing data therein. In some implementations, apparatus 420 may further include a memory 424 coupled to processor 422 and capable of being accessed by processor 422 and storing data therein. Each of memory 414 and memory 424 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 414 and memory 424 may include a type of read-only memory (ROM) such as mask ROM, programmable ROM (PROM), erasable programmable ROM (EPROM) and/or electrically erasable programmable ROM (EEPROM). Alternatively, or additionally, each of memory 414 and memory 424 may include a type of non-volatile random-access memory (NVRAM) such as flash memory, solid-state memory, ferroelectric RAM (FeRAM), magnetoresistive RAM (MRAM) and/or phase-change memory.

Each of apparatus 410 and apparatus 420 may be a communication entity capable of communicating with each other using various proposed schemes in accordance with the present disclosure. For illustrative purposes and without limitation, a description of capabilities of apparatus 410, as a UE, and apparatus 420, as a base station of a serving cell of a wireless network (e.g., 5G/NR mobile network), is provided below. It is noteworthy that, although the example implementations described below are provided in the context of a UE, the same may be implemented in and performed by a base station. Thus, although the following description of example implementations pertains to apparatus 410 as a UE, the same is also applicable to apparatus 420 as a network node or base station such as a gNB, TRP or eNodeB of a wireless network such as a 5G NR mobile network.

Under a proposed scheme with respect to channel multiplexing within interlace for NR-U operation in accordance with the present disclosure, processor 412 of apparatus 410 may determine which sub-interlace of multiple sub-interlaces in each of a plurality of interlaces is assigned to apparatus 410. Additionally, processor 412 may perform, via transceiver 416, an UL transmission to a wireless network in an NR-U using the assigned sub-interlace in each of the plurality of interlaces, which may be divided into respective multiple sub-interlaces with channel multiplexing.

In some implementations, each of the plurality of interlaces may be divided into the respective multiple sub-interlaces by FDM such that each of the plurality of interlaces is assigned to multiple UEs, including apparatus 410. In some implementations, more than one of the plurality of interlaces may be allocated to each of the multiple UEs such that a power level at which each of the multiple UEs performs UL transmissions is multiplied.

In some implementations, each of the plurality of interlaces may be divided into the respective multiple sub-interlaces by CDM such that each of the plurality of interlaces is assigned to multiple UEs, including apparatus 410. In some implementations, more than one of the plurality of interlaces may be allocated to each of the multiple UEs such that a power level at which each of the multiple UEs performs UL transmissions is multiplied.

In some implementations, each of the plurality of interlaces may be divided into the respective multiple sub-interlaces by TDM such that each of the plurality of interlaces is assigned to multiple UEs, including apparatus 410. In some implementations, more than one of the plurality of interlaces may be allocated to each of the multiple UEs such that a power level at which each of the multiple UEs performs UL transmissions is multiplied.

In some implementations, the plurality of interlaces each of which divided into the respective multiple sub-interlaces may include interlaces at two opposite ends of the NR-U. In some implementations, each of one or more interlaces in a spectrum between the two opposite ends of the NR-U may not be divided with channel multiplexing. Alternatively, each of one or more interlaces in a spectrum between the two opposite ends of the NR-U may also be divided into respective multiple sub-interlaces with channel multiplexing.

Illustrative Processes

FIG. 5 illustrates an example process 500 in accordance with an implementation of the present disclosure. Process 500 may represent an aspect of implementing various proposed designs, concepts, schemes, systems and methods described above. More specifically, process 500 may represent an aspect of the proposed concepts and schemes pertaining to channel multiplexing within interlace for NR-U operation. Process 500 may include one or more operations, actions, or functions as illustrated by one or more of blocks 510 and 520. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively in a different order. Furthermore, one or more of the blocks/sub-blocks of process 500 may be executed repeatedly or iteratively. Process 500 may be implemented by or in apparatus 410 and apparatus 420 as well as any variations thereof. Solely for illustrative purposes and without limiting the scope, process 500 is described below in the context of apparatus 410 as a UE and apparatus 420 as a base station of a wireless network such as a 5G/NR mobile network. Process 500 may begin at block 510.

At 510, process 500 may involve processor 412 of apparatus 410 determining which sub-interlace of multiple sub-interlaces in each of a plurality of interlaces is assigned to apparatus 410. Process 500 may proceed from 510 to 520.

At 520, process 500 may involve processor 412 performing, via transceiver 416, an UL transmission to a wireless network in an NR-U using the assigned sub-interlace n each of the plurality of interlaces, which may be divided into respective multiple sub-interlaces with channel multiplexing.

In some implementations, each of the plurality of interlaces may be divided into the respective multiple sub-interlaces by FDM such that each of the plurality of interlaces is assigned to multiple UEs, including apparatus 410. In some implementations, more than one of the plurality of interlaces may be allocated to each of the multiple UEs such that a power level at which each of the multiple UEs performs UL transmissions is multiplied.

In some implementations, each of the plurality of interlaces may be divided into the respective multiple sub-interlaces by CDM such that each of the plurality of interlaces is assigned to multiple UEs, including apparatus 410. In some implementations, more than one of the plurality of interlaces may be allocated to each of the multiple UEs such that a power level at which each of the multiple UEs performs UL transmissions is multiplied.

In some implementations, each of the plurality of interlaces may be divided into the respective multiple sub-interlaces by TDM such that each of the plurality of interlaces is assigned to multiple UEs, including apparatus 410. In some implementations, more than one of the plurality of interlaces may be allocated to each of the multiple UEs such that a power level at which each of the multiple UEs performs UL transmissions is multiplied.

In some implementations, the plurality of interlaces each of which divided into the respective multiple sub-interlaces may include interlaces at two opposite ends of the NR-U. In some implementations, each of one or more interlaces in a spectrum between the two opposite ends of the NR-U may not be divided with channel multiplexing. Alternatively, each of one or more interlaces in a spectrum between the two opposite ends of the NR-U may also be divided into respective multiple sub-interlaces with channel multiplexing.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    determining, by a processor of an apparatus, which sub-interlace of multiple sub-interlaces in each of a plurality of interlaces is assigned to the apparatus; and
    performing, by the processor, an uplink (UL) transmission to a wireless network in a New Radio unlicensed spectrum (NR-U) using the assigned sub-interlace in each of the plurality of interlaces,
    wherein each of the plurality of interlaces is divided into respective multiple sub-interlaces with channel multiplexing,
    wherein, responsive to a total number of physical resource blocks (PRBs) per symbol being not an integer multiple of a number of interlaces per symbol, the channel multiplexing is rendered for each of one or more remaining PRBs located at two opposite ends of the NR-U, and
    wherein more than one of the plurality of interlaces are allocated to each of the multiple UEs such that a power level at which each of the multiple UEs performs UL transmissions is multiplied.

2. The method of claim 1, wherein each of the plurality of interlaces is divided into the respective multiple sub-interlaces by frequency-division multiplexing (FDM) such that each of the plurality of interlaces is assigned to multiple user equipment (UEs).

3. The method of claim 1, wherein each of the plurality of interlaces is divided into the respective multiple sub-interlaces by code-division multiplexing (CDM) such that each of the plurality of interlaces is assigned to multiple user equipment (UEs).

4. The method of claim 1, wherein each of the plurality of interlaces is divided into the respective multiple sub-interlaces by time-division multiplexing (TDM) such that each of the plurality of interlaces is assigned to multiple user equipment (UEs).

5. The method of claim 1, wherein the plurality of interlaces each of which divided into the respective multiple sub-interlaces comprise interlaces at the two opposite ends of the NR-U.

6. The method of claim 5, wherein each of one or more interlaces in a spectrum between the two opposite ends of the NR-U is not divided with channel multiplexing.

7. The method of claim 5, wherein each of one or more interlaces in a spectrum between the two opposite ends of the NR-U is also divided into respective multiple sub-interlaces with channel multiplexing.

8. An apparatus, comprising:
    a transceiver which, during operation, wirelessly communicates with a wireless network; and
    a processor coupled to the transceiver such that, during operation, the processor performs operations comprising:
        determining which sub-interlace of multiple sub-interlaces in each of a plurality of interlaces is assigned to the apparatus; and
        performing, via the transceiver, an uplink (UL) transmission to a wireless network in a New Radio unlicensed spectrum (NR-U) using the assigned sub-interlace in each of the plurality of interlaces,
    wherein each of the plurality of interlaces is divided into respective multiple sub-interlaces with channel multiplexing,
    wherein, responsive to a total number of physical resource blocks (PRBs) per symbol being not an integer multiple of a number of interlaces per symbol, the channel multiplexing is rendered for each of one or more remaining PRBs located at two opposite ends of the NR-U, and
    wherein more than one of the plurality of interlaces are allocated to each of the multiple UEs such that a power level at which each of the multiple UEs performs UL transmissions is multiplied.

9. The apparatus of claim 8, wherein each of the plurality of interlaces is divided into the respective multiple sub-interlaces by frequency-division multiplexing (FDM) such that each of the plurality of interlaces is assigned to multiple user equipment (UEs).

10. The apparatus of claim 8, wherein each of the plurality of interlaces is divided into the respective multiple sub-interlaces by code-division multiplexing (CDM) such that each of the plurality of interlaces is assigned to multiple user equipment (UEs).

11. The apparatus of claim 8, wherein each of the plurality of interlaces is divided into the respective multiple sub-interlaces by time-division multiplexing (TDM) such that each of the plurality of interlaces is assigned to multiple user equipment (UEs).

12. The apparatus of claim 8, wherein the plurality of interlaces each of which divided into the respective multiple sub-interlaces comprise interlaces at the two opposite ends of the NR-U.

13. The apparatus of claim 12, wherein each of one or more interlaces in a spectrum between the two opposite ends of the NR-U is not divided with channel multiplexing.

14. The apparatus of claim 12, wherein each of one or more interlaces in a spectrum between the two opposite ends of the NR-U is also divided into respective multiple sub-interlaces with channel multiplexing.

\* \* \* \* \*